(12) United States Patent
Sprenger

(10) Patent No.: US 8,025,253 B2
(45) Date of Patent: Sep. 27, 2011

(54) COMMERCIAL AIRCRAFT WITH A MAIN DECK AND A LOWER DECK

(75) Inventor: Wilfried Sprenger, Büsum (DE)

(73) Assignee: Airbus Deutschland GmbH (DE)

( * ) Notice: Subject to any disclaimer, the term of this patent is extended or adjusted under 35 U.S.C. 154(b) by 148 days.

(21) Appl. No.: 11/631,747

(22) PCT Filed: Jul. 8, 2005

(86) PCT No.: PCT/EP2005/007437
§ 371 (c)(1),
(2), (4) Date: Jan. 11, 2008

(87) PCT Pub. No.: WO2006/005550
PCT Pub. Date: Jan. 19, 2006

(65) Prior Publication Data
US 2008/0251641 A1 Oct. 16, 2008

(30) Foreign Application Priority Data
Jul. 8, 2004 (DE) .......................... 10 2004 033 068

(51) Int. Cl.
*B64C 25/10* (2006.01)
*B64C 1/00* (2006.01)
*B64D 45/00* (2006.01)
(52) U.S. Cl. ...................... 244/121; 244/102 R; 244/119
(58) Field of Classification Search ............... 188/375, 188/376, 377; 244/119, 118.6, 118.5, 45 R, 244/102 R, 120, 121, 13
See application file for complete search history.

(56) References Cited

U.S. PATENT DOCUMENTS

| 2,156,773 | A | | 5/1939 | Sokorsky |
| 2,434,464 | A | | 1/1948 | Lemonier et al. |
| 2,777,652 | A | | 1/1957 | Grudin |
| 3,405,893 | A | | 10/1968 | Flamand et al. |
| 3,614,028 | A | | 10/1971 | Kleckner |
| 4,638,962 | A | | 1/1987 | Gunter et al. |
| 4,925,132 | A | | 5/1990 | Zider et al. |
| 5,435,504 | A | | 7/1995 | Inoue et al. |
| 5,542,626 | A | * | 8/1996 | Beuck et al. ............ 244/119 |
| 5,752,673 | A | * | 5/1998 | Schliwa et al. ............ 244/118.6 |
| 6,152,400 | A | * | 11/2000 | Sankrithi et al. ............ 244/118.5 |

(Continued)

FOREIGN PATENT DOCUMENTS
DE 1 481 622 10/1966
(Continued)

*Primary Examiner* — Tien Dinh
*Assistant Examiner* — Richard Green
(74) *Attorney, Agent, or Firm* — Lerner, David, Littenberg, Krumholz & Mentlik, LLP

(57) ABSTRACT

In a commercial aircraft with a main deck (2) and a lower deck (5, 6), at least one passenger cabin (16, 16') is also provided on the lower deck. The fuselage diameter lies on the order of a wide-body aircraft, and an energy-absorbing deformation structure (22, 23, 24) is arranged underneath the lower deck cabin. The invention proposes to arrange the wings (7) on the aircraft fuselage in accordance with the shoulder wing configuration, and to arrange the landing gear (10) outside on the fuselage such that the landing gear bays are spaced apart from one another by a certain distance that is defined by the positioning of the bottom longeron spars (9). This may provide that the lower deck volume situated underneath the main deck can be optimally utilized for payloads. The lower deck areas may also be interconnected in such a way that a significant useful width of the passage between the landing gear bays is achieved.

7 Claims, 3 Drawing Sheets

U.S. PATENT DOCUMENTS

| | | | |
|---|---|---|---|
| 6,293,497 B1 * | 9/2001 | Kelley-Wickemeyer et al. | 244/45 R |
| 6,834,833 B2 * | 12/2004 | Sankrithi | 244/119 |
| 2004/0056469 A1 * | 3/2004 | Karaki et al. | 280/784 |

FOREIGN PATENT DOCUMENTS

| | | |
|---|---|---|
| DE | 14 81 677 A1 | 3/1969 |
| DE | 2 025 097 | 5/1970 |
| DE | 29 24 742 A1 | 6/1979 |
| DE | 4116524 A1 | 11/1992 |
| DE | 44 16 560 A1 | 5/1994 |
| DE | 43 13 592 A1 | 10/1994 |
| DE | 44 16 506 A1 | 11/1995 |
| DE | 196 20 166 A1 | 11/1997 |
| DE | 101 45 272 A1 | 9/2001 |
| DE | 102 07 767 A1 | 2/2002 |
| FR | 1 473 111 A | 6/1967 |
| GB | 2 169 256 A | 7/1986 |
| JP | 06-255587 A | 9/1994 |
| RU | 2196707 C2 | 1/2003 |

\* cited by examiner

COMMERCIAL AIRCRAFT WITH A MAIN DECK AND A LOWER DECK

FIELD OF THE INVENTION

The present invention relates to commercial aircraft. In particular, the present invention relates to a commercial aircraft with a main deck, a lower deck and a fuselage diameter on the order of a wide-body aircraft, wherein at least one passenger cabin is provided on the lower deck, and wherein an energy-absorbing deformation structure is arranged underneath the lower deck cabin.

TECHNOLOGICAL BACKGROUND

With respect to the economic feasibility of commercial aircraft, it is important to design as much of the available fuselage volume as possible for accommodating payloads or, in other words, to prevent unnecessary voids in the fuselage. One particular problem arises when—for example, in modern wide-body aircraft—the cargo space underneath the main deck is larger than necessary for transporting the luggage of the passengers. Although a sufficient volume for additional freight containers is available in this case, the revenues are reduced in comparison with the more economical transport of passengers.

In wide-body aircraft, in particular, with an average fuselage diameter in excess of 5 m, a lower deck of corresponding size is provided underneath the very wide main deck that approximately lies in the center of the fuselage cross section. This geometry also ensures the accessibility of the lower deck, for example, if part of the cargo space floor is lowered and forms a center aisle. A lower deck that can be utilized by persons is known and described, for example, in DE 44 16 506 C2.

According to DE 43 13 592 C2, passengers can be accommodated in the lower deck due to the fact that energy-absorbing structural elements are arranged underneath the lower fuselage shell in order to protect the passengers by reducing the impact forces in case of a crash. This publication discusses a conventional low-wing commercial aircraft, in which the utilization of the lower deck is significantly restricted due to the space requirement of wing torsion boxes and landing gears. In such instances, the lower deck is not realized continuously, i.e., passenger areas situated forward and rearward of the wing and the landing gears are not interconnected.

SUMMARY OF THE INVENTION

It is an objective of the present invention to propose a safe lower deck passenger cabin of the greatest length possible for a commercial aircraft with a fuselage diameter on the order of a wide-body aircraft and a main deck designed for use by passengers.

According to the invention, this objective may be solved by the features disclosed in claim 1.

The invention essentially proposes to install the wings of a wide-body aircraft in accordance with the shoulder wing configuration, and to arrange the landing gear outside on the fuselage such that it is spaced apart from the center plane by a certain distance. This ensures that the maximum volume of the lower deck situated underneath the main deck is available for payloads. In addition, it may be possible to realize a passage with a large useful width in order to interconnect the passenger areas on the lower deck.

In comparison with the low-wing configuration, the shoulder wing configuration may make it possible to achieve a more balanced ratio between the space for luggage containers and the space for passengers on the lower deck and, in particular, to realize shorter aircraft fuselages. As mentioned above, the elimination of the wing centerpiece and the interior landing gear bays provided in low-wing aircraft may result in more useful space in the lower deck region of a shoulder wing aircraft. This means that the fuselage may be considerably shortened such that the aircraft has an altogether lower weight. Due to the geometric relations in aircraft fuselages with a diameter >5 m, the shoulder wing configuration may make it possible to streamline the wing into the top of the tubular fuselage such that it generates little resistance. In this case, the wing torsion box penetrates the upper part of the main deck cabin while the upper side of the wing only protrudes slightly over the fuselage. With respect to the geometry in question, this means that a sufficient clear height for installing a continuous row of carry-on luggage receptacles is available in the main deck cabin within the wing region. Since the upper side of the wing only protrudes slightly over the fuselage, it may also be possible to realize a relatively small wing/fuselage fairing that generates little resistance. According to an exemplary embodiment of the present invention, the main landing gears are mounted outside on the fuselage to exactly such a degree that a sufficient cabin width for infrastructure areas (e.g., stairs, galley, aisle) is available on the lower deck between the walls of the landing gear bays formed by the bottom longeron spars, and that the outwardly curved landing gear fairings only generate little aerodynamic resistance.

A shoulder wing configuration may provide a large portion of the lower deck space that is occupied by the wings and the landing gears in low-wing aircraft becomes available for accommodating payloads. As mentioned above, a significantly larger number of passengers may be transported on an aircraft of the discussed category. This has positive effects on efforts to lower the operating costs that are directly related to the number of seats.

Further exemplary embodiments and additional developments of the invention are disclosed in claims 2-10. Other details and advantages are discussed in the following description of an exemplary embodiment of the invention.

According to an exemplary embodiment, the longeron spars are laterally positioned such that they are approximately spaced apart from one another by a distance that corresponds to 40-60% of the fuselage diameter. The bottom spars of modern low-shoulder wide-body aircraft of the discussed size, in contrast, are spaced apart from one another by a much shorter distance, namely about the width of a landing gear bay, such that the lower deck cannot be utilized in the region of these landing gear bays.

In order to protect the lower deck passengers in case of a crash, the invention proposes to optimally absorb or divert the crash energy due to the interaction of special safety engineering measures. The lower deck cabin is realized in the form of a safety cell with the aid of structural reinforcements, and a deformation structure that acts as a so-called "crumple zone" is arranged on the fuselage shell underneath the lower deck cabin. In case of a crash, this safety concept protects the lower deck cabin from stresses that act from above as well as form below during the impact. When the impact occurs, the deformation structure absorbs energy by means of corresponding energy-absorbing materials, for example, collapsing elements with defined buckling characteristics.

SHORT DESCRIPTION OF THE DRAWINGS

The invention is described in greater detail below with reference to FIGS. 1-3.

DETAILED DESCRIPTION OF EXEMPLARY EMBODIMENTS

Figure 1:
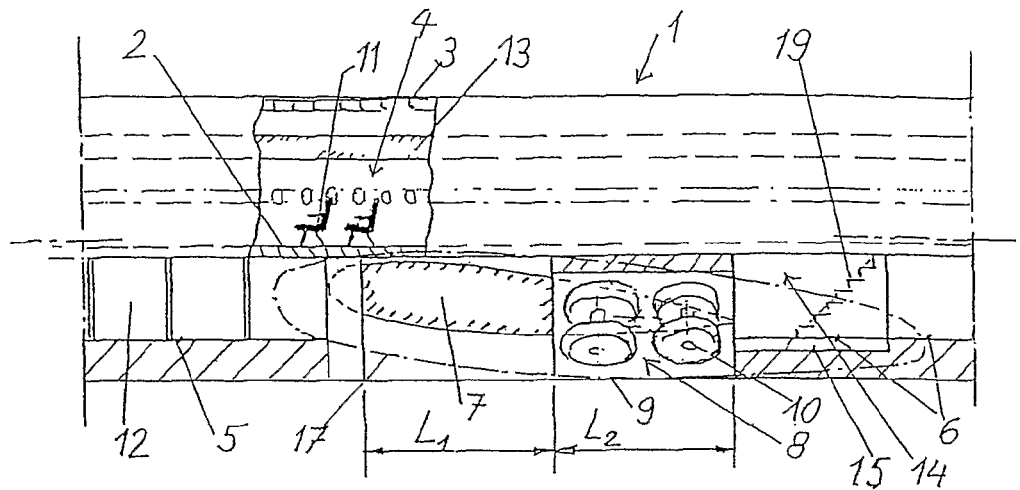
FIG. 1 shows different schematic sections through a conventional low-shoulder commercial aircraft with a fuselage diameter in excess of 5 m.
Figure 1:
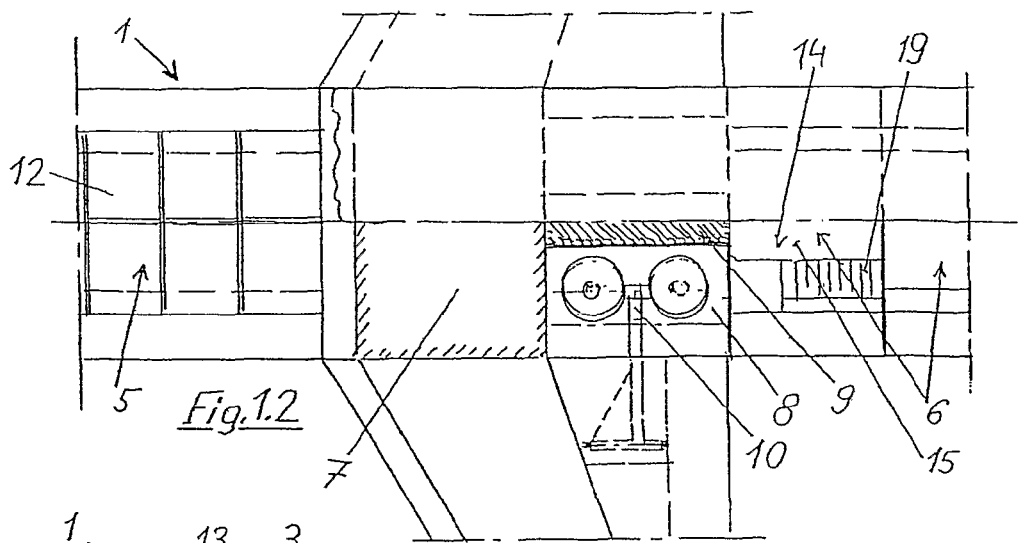
Figure 1:
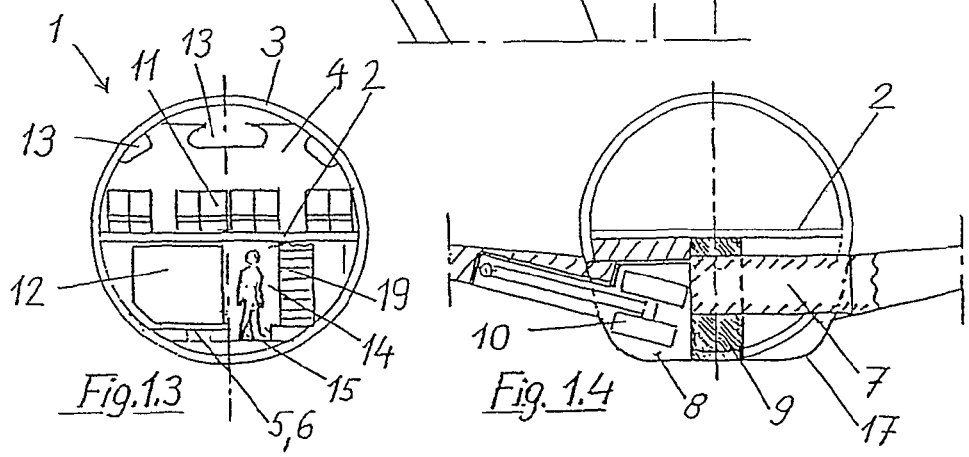

FIG. 1 shows a conventional low-wing wide-body aircraft in the form of horizontal and vertical sections (FIGS. 1.1 and 1.2), as well as cross sections through the fuselage (FIGS. 1.3 and 1.4). A main passenger cabin 4 is essentially formed by the main deck 2 and the upper fuselage shell 3. A front lower deck 5 and a rear lower deck 6, as well as a wing torsion box centerpiece 7 and the landing gear bays 8, are situated underneath the main deck 2. A bottom longeron spar 9 lying between these landing gear bays reinforces the fuselage 1 weakened by the cutouts for the large landing gear bays 8. The bottom longeron spars 9 and the landing gears 10 require so much space that the rear lower deck 6 cannot be extended forward in this region. In practical applications, the length L1 of the lower deck required for the wing centerpiece 7 and the length L2 occupied by the landing gear bays 8 add up to a considerable total length. Since this section of the lower deck cannot be used for payloads, the design engineer is forced to realize the fuselage 1 with a corresponding length. The fuselages of such low-shoulder aircraft are relatively long and have a significantly larger surface area.

FIG. 1.1 shows a longitudinal section through part of the fuselage 1 along a vertical plane of section. In addition to the above-described components, this figure also shows an arrangement of passenger seats 11 and standard freight containers 12.

FIG. 1.2 shows a corresponding section along a horizontal plane. According to this figure, the large landing gear bays 8 and the bottom longeron spar 9 make it impossible to extend the rear lower deck 6 forward. The wing centerpiece 7 also makes it impossible to extend the front lower deck 5 rearward.

The fuselage cross section according to FIG. 1.3 shows the two-aisle arrangement of seats 11 on the main deck 2, as well as the carry-on luggage receptacles or luggage compartments 13 mounted above the seats. Containers 12 or accessible lower deck infrastructure areas 14 with a lowered center aisle 15 are situated underneath the main deck 2. The infrastructure areas 14 consist, for example, of toilets, crew rest areas or on-board kitchens, but not passenger cabins. FIG. 1.3 also indicates that hardly any fuselage structure for protecting the passengers in case of a crash is provided underneath the lower deck 5, 6.

FIG. 1.4 elucidates how the wing centerpiece 7, the landing gear bays 8 and the bottom longeron spar 9 of a low-wing aircraft almost entirely fill out the cross section in the lower deck region. This means that no payloads can be accommodated in these areas, and that the front lower deck 5 and the rear lower deck 6 cannot be interconnected. FIG. 1.4 also shows that the low-wing aircraft requires a relatively large wing/fuselage fairing 17 for accommodating the landing gear.

Figure 2:
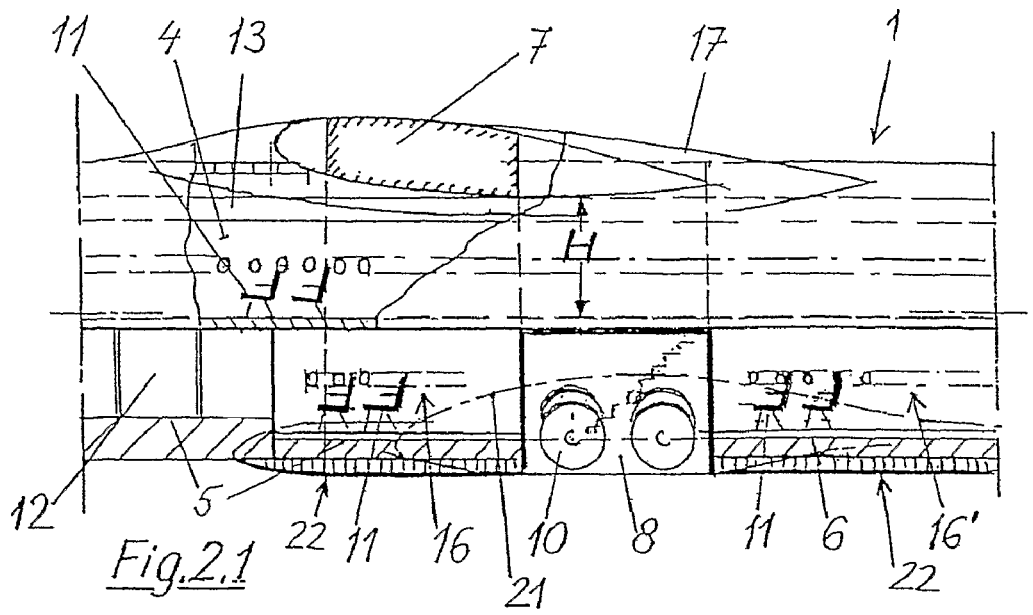
FIG. 2 shows a shoulder wing configuration according to the invention of a commercial aircraft, in which the lower deck is utilized as a passenger cabin.
Figure 2:
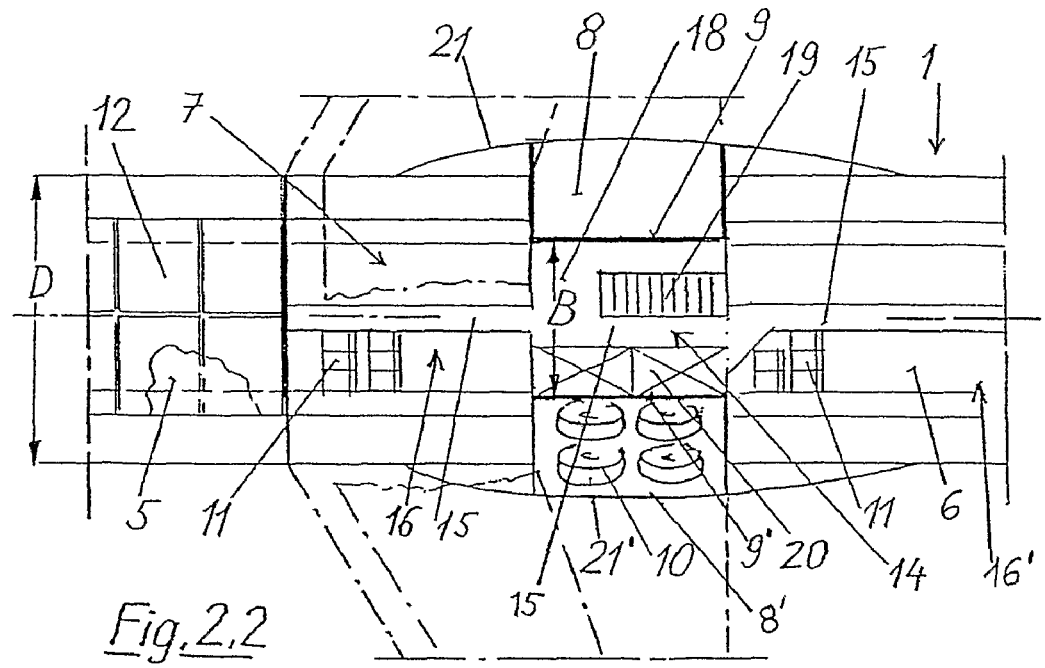

FIG. 2 shows the shoulder wing configuration according to an exemplary embodiment of the present invention of a commercial aircraft, in which the lower deck is utilized as a passenger area. The essential components of the commercial aircraft correspond to those described above with reference to FIG. 1 and are identified by the same reference numerals. According to FIG. 2.1, a main deck cabin 4 still has a sufficient clear height H for installing a continuous row of carry-on luggage receptacles 13 underneath the wing centerpiece 7. Only a relatively small wing/fuselage fairing 17 is required because the wing is partially integrated into the fuselage 1, wherein this fairing also generates only little aerodynamic resistance. For example, freight containers 12, a passenger cabin area 16 and infrastructure areas 14 lying between the landing gear bays 8, 8' are situated in the front lower deck 5 (see FIG. 2.2). These areas are connected to another lower deck cabin area 16' in the rear lower deck 6. The corridor 18 is laterally limited by the landing gear bays 8, 8' and the bottom longeron spars 9, 9' that transmit forces from the rear section of the fuselage 1 forward and thusly reinforce the fuselage in the region of the cutouts required for the landing gear bays 8. The spars 9 and 9' are spaced apart from one another by a distance B that preferably corresponds to 40-60% of the fuselage diameter or fuselage width (D). The geometry according to the invention results in a corridor 18 with sufficient space, for example, for an aisle 15, stairs 19 or an on-board kitchen 20; in addition, the landing gear fairings 21 and 21' can be realized relatively small. According to this figure, passengers are not accommodated in the corridor because it is not provided with any windows. An energy-absorbing deformation structure 22 is arranged on the fuselage 1 underneath the lower deck cabins 16 and 16'. This deformation structure does not significantly increase the aerodynamic resistance because it is incorporated into the landing gear fairings 21 and 21'.

Figure 3:
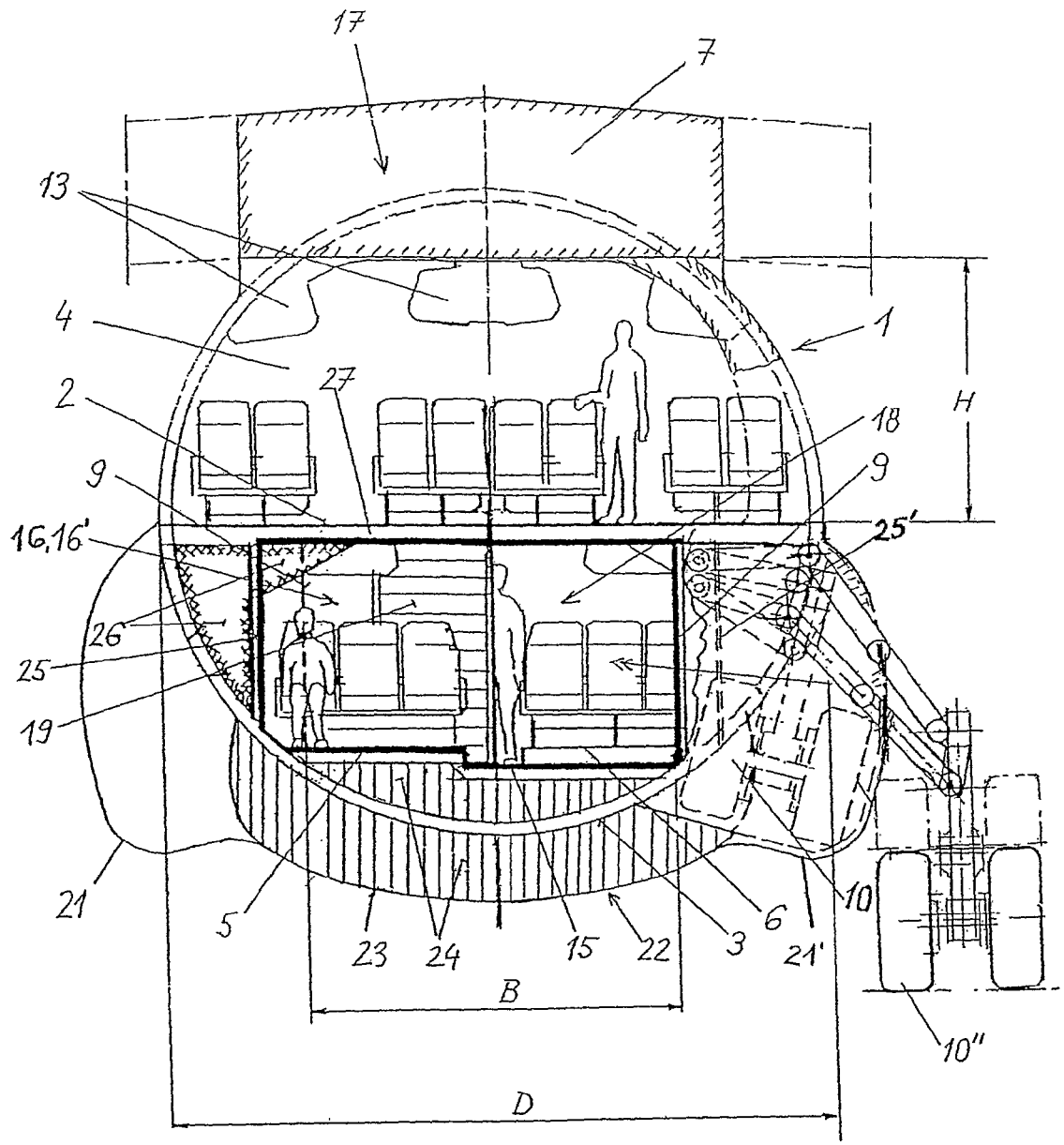
FIG. 3 shows a cross section through the fuselage of the shoulder wing aircraft according to an exemplary embodiment of the present invention.

FIG. 3 shows a cross section through the fuselage of a commercial aircraft according to an exemplary embodiment of the present invention that is realized in accordance with the shoulder wing configuration. The features or measures proposed by the invention may provide for arranging passenger cabins 16 and 16' in the lower deck areas 5 and 6 of this aircraft. The passenger cabin 16, 16' is designed in the form of a safety cell with reinforced structural components (bordered by bold lines in the figures) and also provided with a deformation structure 22 that is arranged outside on the fuselage shell 3, namely underneath the passenger cabin 16, 16' located on the lower decks 5 and 6. The interior of this deformation structure contains elements 24 with defined energy-absorbing characteristics. In the embodiment shown, these elements may also be extended as far as the lower decks 5 and 6 within the fuselage 1. The elements 24 and the crumple zone are indicated by a vertical hatching in the figure. One can easily ascertain that the crumple zone with the elements 24 on the outside and the inside of the fuselage 1 has a significant deformation path. The protection provided by the lower deck safety cell 16, 16' is additionally promoted by shear sections 26 that are arranged on the vertical spars 25 and 25' and connected to the fuselage shell 3. These shear sections also shorten the bending length of the main deck spars 27 and thusly prevent the main deck from smashing down in case of a crash. The lower deck passengers are also protected in case of an impact by the sturdy landing gear frames. If viewed from the front, the landing gear fairings 21 and 21' are partially aligned with the fairing of the deformation structure 23 such that a favorable resistance is achieved. In case of a crash, passengers can be evacuated in the region of the lower deck cabins 16 and 16' by installing corresponding doors or emergency exits. In case of a crash landing in water, the lower deck passengers use the stairs 19 to reach the main deck and then exit through the doors of the main deck cabin 4.

With respect to its outside contour, the deformation structure is realized similar to modern wing/fuselage fairings in order to achieve a low weight and little resistance. For example, the deformation structure consists of an aerodynamically shaped outer composite shell, the interior of which contains energy-absorbing elements 24. This may ensure that the high g-load is absorbed in case of a crash due to the deformation of the materials in the crumple zone while the reinforced lower deck cabin acts as a safety cell. In order to protect the main deck from smashing down on the lower deck, the vertical struts provided in the lower deck cabin (for the upper floor spars) are reinforced and the struts contain a shear wall that is respectively connected to the fuselage cell and the frame, for example, at every second frame division such that the view from the lower deck windows is not excessively restricted. If the aforementioned shear wall is designed accordingly, it is possible to shorten the bending length of the main deck floor spars to such a degree that the crash stability of the main deck is improved.

The energy-absorbing elements 24 may be realized in different ways, for example, in the form of a framework of collapsing struts, an energy-absorbing foam core or tubular composite structures. The selection criteria in this respect are low weight and high energy absorption.

The figures are drawn approximately true-to-scale and indicate that a sufficient height H of preferably 2.2-2.4 m is available above the main deck 2 for installing carry-on luggage compartments 13. The upper wing centerpiece 7 only protrudes insignificantly over the fuselage 1 such that the wing/fuselage fairing 17 can be realized relatively small and generates little resistance. The sections through the lower deck area show, for example, that a passenger cabin 16 is arranged on the left side of the front lower deck 5. The deformation structure 22 is situated underneath this passenger cabin. The landing gear area and the corridor 18 situated between the bottom longeron spars 9 and 9' that are spaced apart from one another by the distance B are shown on the right side. The landing gear 10 is arranged outside of the fuselage 3, namely such that it is spaced apart from the center plane by a certain distance. The resulting width B may make it possible to accommodate stairs 19, an aisle 15 and other infrastructure areas at this location, wherein the width B preferably amounts to 40-60% of the fuselage width (or the fuselage diameter) D. If the width B would be chosen even larger, the landing gears would be shifted further outward such that the resistance would increase; if this width would be chosen smaller, the useful space would be restricted and the landing gear track would become unfavorably narrow. The corridor 18 interconnects the passenger cabins 16 in the front and rear lower deck areas 5 and 6. This allows an increased flexibility in relation to a low-wing aircraft. In comparison with a low-wing aircraft, the space gained on the lower deck by eliminating the wing centerpiece and the landing gears can be commercially utilized almost in its entirety, i.e., nearly the entire fuselage volume is utilized.

In addition, a shoulder wing aircraft—depending on the fuselage thickness—may generate greater aerodynamic lift than a low-shoulder aircraft. This may provide for a utilization of shorter and lighter wings. The fuselage of a shoulder wing aircraft may also be situated approximately 1 m closer to the taxiway such that access, maintenance and evacuation are simplified. This may lower the operating and maintenance costs over the lifetime of the aircraft and naturally has positive effects on the market opportunities of the manufacturer as well as the airline.

It should be noted that the term "comprising" does not exclude other elements or steps and the "a" or "an" does not exclude a plurality. Also elements described in association with different embodiments may be combined.

It should also be noted that reference signs in the specification or in the claims shall not be construed as limiting the scope of the invention.

LIST OF REFERENCE SYMBOLS

1 Fuselage
2 Main deck
3 Fuselage shell
4 Main deck passenger cabin
5 Front lower deck, forward of 18
6 Rear lower deck, rearward of 18
7 Wing (torsion box) centerpiece
8, 8' Landing gear bay
9, 9' Bottom longeron spar
10 Landing gear, 10"=lowered
L1 Lower deck length for wing centerpiece
L2 Lower deck length for landing gear
11 Passenger seats, seat arrangement
12 (Standard) freight container
13 Carry-on luggage receptacles
14 Lower deck infrastructure areas
15 Lower deck center aisle
16 Lower deck passenger cabin(s)
17 Wing/fuselage fairing
18 Corridor
B Distance between spars 9, 9'
D Fuselage diameter (or fuselage width)
H Height of main deck cabin, approximately 2.3 m)
19 Stairs
22 Galley or service areas
21, 21' Landing gear fairings
22 Deformation structure
23 Fairing of 22
24 Energy-absorbing elements
25 Vertical strut
26 Shear section
27 Main deck spar subjected to bending

The invention claimed is:

1. A commercial aircraft comprising:
a fuselage,
a main deck,
a lower deck,
an energy-absorbing deformation structure,
wings,
main landing gears,
landing gear bays, and
bottom longeron spars,
wherein the fuselage comprises a lateral overall diameter of a wide-body aircraft,
wherein at least one passenger cabin is provided on the lower deck, and
wherein the energy-absorbing deformation structure is arranged underneath the lower deck cabin,
wherein the wings are arranged on the fuselage in accordance with a high wing configuration,
wherein the main landing gear are arranged each on one side of the fuselage, the main landing gears each being accommodated in a landing gear bay such that each landing gear bay extends partially outside of the fuselage, wherein the bottom longeron spars extend in a longitudinal direction of the fuselage and reinforce the fuselage in the region of cutouts formed by the landing gear bays, wherein the landing gear bays are spaced apart from one another laterally by a distance that is defined by the position of the bottom longeron spars, wherein a corridor is formed between the bottom longeron spars in the region of the cutouts formed by the landing gear bays, and wherein lower deck infrastructure areas selected from the group consisting of stairs, an on-board kitchen, a toilet and general services areas are located in the corridor between the bottom longeron spars in the region of the cutouts formed by the landing gear bays, wherein the deformation structure comprises an aerodynamically shaped external composite shell, the interior of which contains energy-absorbing elements, wherein the deformation structure is arranged outside on the fuselage and wherein the energy-absorbing elements of the deformation structure extend inward as far as the longeron spars of the lower deck.

2. The commercial aircraft of claim 1,
wherein the underside of the wing center section is arranged above the main deck, wherein the aircraft further comprises carry-on luggage compartments at the main deck, and
wherein the landing gear bays are arranged spaced apart from one another laterally by a distance that amounts to 40-60% of the lateral overall fuselage diameter.

3. The commercial aircraft of claim 1,
wherein the at least one passenger cabin provided on the lower deck is arranged in a longitudinal direction of the aircraft in at least one of a front lower deck area and a rear lower deck area.

4. The commercial aircraft of claim 1,
wherein the lower deck passenger cabin is adapted in the form of a safety cell by means of shear sections, vertical struts, and reinforcing bottom longeron spars in the lower deck, and wherein the lower deck passenger cabin is connected to the deformation structure.

5. The commercial aircraft of claim 1,
wherein the energy-absorbing elements comprise collapsing struts forming a framework.

6. The commercial aircraft of claim 1,
wherein the energy-absorbing elements comprise a tubular composite structure.

7. The commercial aircraft of claim 1,
wherein the energy-absorbing elements comprise an energy-absorbing foam core.

* * * * *